(12) United States Patent
Neuhaus et al.

(10) Patent No.: US 8,353,336 B2
(45) Date of Patent: Jan. 15, 2013

(54) POWER TRANSMISSION SYSTEM FOR USE WITH DOWNHOLE EQUIPMENT

(75) Inventors: Christoph Neuhaus, Aachen (DE); Andreas Koenig, Dusseldorf (DE); Rik De Doncker, Leuven (BE)

(73) Assignee: Zeitecs B.V., Rijswijk (NL)

( * ) Notice: Subject to any disclaimer, the term of this patent is extended or adjusted under 35 U.S.C. 154(b) by 393 days.

(21) Appl. No.: 12/598,884

(22) PCT Filed: May 2, 2008

(86) PCT No.: PCT/EP2008/055440
§ 371 (c)(1),
(2), (4) Date: Apr. 22, 2010

(87) PCT Pub. No.: WO2008/148613
PCT Pub. Date: Dec. 11, 2008

(65) Prior Publication Data
US 2010/0206554 A1 Aug. 19, 2010

(30) Foreign Application Priority Data
May 4, 2007 (GB) .................................. 0708652.3

(51) Int. Cl.
*E21B 4/04* (2006.01)
(52) U.S. Cl. ...................................... 166/66.4; 166/65.1
(58) Field of Classification Search .................. 166/65.1, 166/66.4, 244.1, 250.15
See application file for complete search history.

(56) References Cited

U.S. PATENT DOCUMENTS

| 3,342,275 | A | * | 9/1967 | Mellies ........................ 175/4.51 |
| 5,053,666 | A | * | 10/1991 | Kliman et al. ......... 310/216.075 |
| 5,503,666 | A | | 4/1996 | Mennicke et al. |
| 5,523,635 | A | | 6/1996 | Ferreira et al. |
| 5,744,877 | A | | 4/1998 | Owens et al. |
| 6,371,221 | B1 | * | 4/2002 | Harrigan et al. ................. 175/26 |

(Continued)

FOREIGN PATENT DOCUMENTS

| CA | 2270017 | 4/1999 |
| CA | 2509180 | 6/2005 |
| EP | 0 367 870 A | 5/1990 |
| EP | 1 316 672 | 6/2003 |
| WO | WO2004/111389 | 12/2004 |
| WO | WO2005/111484 | 11/2005 |
| WO | WO2008/148613 A4 | 12/2008 |

OTHER PUBLICATIONS

International Search Report for PCT/EP2008/055440, 6 pages.
Written Opinion for PCT/EP2008/05540, 6 pages.

(Continued)

*Primary Examiner* — Brad Harcourt
(74) *Attorney, Agent, or Firm* — Patterson & Sheridan, L.L.P.

(57) ABSTRACT

A power transmission system for use with downhole equipment in a borehole includes a power source that is positioned at the surface providing a DC power supply, a downhole DC/DC converter and a two-conductor cable connecting the power source and the downhole DC/DC converter. The power transmission system receives the DC voltage supply as an input and provides an output DC supply at a different voltage to the DC power supply for provision to the downhole equipment.

32 Claims, 5 Drawing Sheets

U.S. PATENT DOCUMENTS

2007/0045005 A1   3/2007   Tchakarov et al.
2007/0046126 A1*  3/2007   Sagoo et al. .................. 310/168
2007/0046225 A1   3/2007   Ahmed

OTHER PUBLICATIONS

International Preliminary Report on Patentability dated Apr. 23, 2009, International Application No. PCT/EP2008/055440.

EPO Examination Report dated Jun. 18, 2012, European Patent Application No. 08750008.8.

Rockwell Automation—"Variable Frequency Drives Optimize Performance and Protection of Offshore Oil Electric Submersible Pumps—Application Notes," copyright 2001.

Rockwell Automation—"Application Profile—Petrochemical Pumping Solutions," copyright 2006.

* cited by examiner

POWER TRANSMISSION SYSTEM FOR USE WITH DOWNHOLE EQUIPMENT

TECHNICAL FIELD

This invention relates to power transmission system for use with downhole equipment. In particular, the invention relates to a system permitting the use of switched reluctance motors (SRMs) for driving electric submersible pumps (ESPs)

BACKGROUND ART

In oil well applications, there are a number of devices that operate downhole using electric power. Power is typically provided as three-phase AC current. However, this can lead to certain limitations. Because of the need to use three conductor cable, the overall weight of a long cable can be very high, leading to an effective upper limit on cable length of 5-7 km due to mechanical strength limitations. The maximum operational voltage of such systems is limited to less than about 5 kV leading to the need to use high current if high power is required.

ESPs are well-known for pumping oil from boreholes. They are positioned at downhole locations and are provided with electric power from the surface via a cable running along the well or borehole. Because electrical power is typically provided in AC form and because most of the control of the power electronics is conducted at the surface, the start-up of ESPs is effectively uncontrolled and thus can potentially lead to burnout of motors if there is high physical resistance in the pump (e.g. due to viscous oils, build-up of deposits, etc.). Previous proposals have been made to avoid some of these problems by using DC power supplies. Examples can be found in WO 2005/111484; EP 1 316672 and U.S. Pat. No. 5,744,877.

SRMs are well known for powering equipment requiring a motor drive using an electrical power source. Their benefits are well-documented. Their use has been proposed for surface drives for downhole pumps (see, for example, CA 2 270 017 and CA 2 509 180).

SUMMARY

In some embodiments, a power transmission system avoids some of the problems associated with existing AC systems and allows effective use of motors such as SRMs to drive downhole equipment such as ESPs. In some embodiments, a medium voltage DC power supply is provided to the downhole equipment.

An embodiment of a downhole equipment system for use in boreholes includes a power transmission system having a power source positioned at the surface providing a DC power supply and a downhole DC/DC converter. A two-conductor cable connects the power source to the downhole DC/DC converter, receiving the DC voltage supply as an input and providing an output DC supply at a different voltage to the DC power supply for provision to the downhole equipment. The system includes dowhole equipment including an electric motor, (such as an electric submersible pump (ESP)), located in the borehole and connected to the power transmission system.

In some embodiments, an induction motor or switched reluctance motor (SRM) is provided for driving the downhole equipment.

A suitable SRM can include a stator and a rotor, each typically having cooling channels carrying a cooling fluid. It can also comprise aluminum windings.

In one embodiment, the rotor of the electric motor includes a hollow shaft through which well fluids or a cooling fluid can circulate. It can also include a salient rotor structure having a neutral material filing the spaces between lobes of the rotor.

In some embodiments, the motor can be connected to the equipment so as to provide direct drive without a gearbox.

In an embodiment, the motor includes a series of motor modules, each of which is operable to drive the downhole equipment. Each motor module can have a rotor and stator arrangement with an associated DC/AC converter, the rotors being connected to a drive shaft for driving the equipment. A single DC/DC converter is provided for all motor modules. In some embodiments, a DC bus bar extends through the motor connecting each motor module.

The modular design allows the motor to be articulated between the motor sections. In some embodiments, a bellows housing is provided around the articulations.

Means can be provided to shift each rotor axially in its associated stator if required.

For improved operational control, in some embodiments sensors are provided for monitoring one or more properties of the downhole equipment and a feedback system is provided for using the output of the sensors to control operation of the motor.

An embodiment provides a method of operating a system. Low voltage DC power may be provided at an output of a downhole DC/DC converter, the low voltage DC power may be converted into AC power, and the AC power may be used to operate a motor.

In some embodiments, one or more properties of the downhole equipment, such as its temperature, are monitored and the values of these properties are used to control operation of the motor, for example by controlling the current provided to the motor so as to maintain the monitored temperature within predefined limits.

In some embodiments, operation of the system can include periodically reversing the direction of operation of the motor to clean the downhole equipment. Also, it may be desirable to operate the motor so as to operate the equipment at a very low speed when it is not in use. This can prevent blockage of pumps or the like and, with suitable sensors, or by monitoring the electrical load absorbed by the motor, can be used to determine the viscosity of fluids being pumped.

In an embodiment, a power transmission system for use with downhole equipment in a borehole includes a power source positioned at the surface providing a DC power supply and a downhole DC/DC converter that are connected by a two-conductor cable. In some embodiment, the DC power supply is a medium voltage supply. The power transmission system receives the DC voltage supplied via the cable as an input and provides an output DC power supply at a different voltage for provision to the downhole equipment.

This cable may be a coaxial cable, or parallel (side by side), or a twisted pair. The cable may contain additional electrical conduits for instrumentation or control purposes. It may contain one or more additional flow conduits for delivering insulating and or lubricating oil to the motor, control system and driven equipment to compensate for leakage losses. This cable may be surrounded by one or more layers of armoring made from wire strands. The wire used in the armoring may be steel, another metal, or a man made fibre. The armoring in any cable may be made from a number of different materials.

The conductors in the cable may be copper, steel, aluminum, or another electrically conducting material. In the case of conductors made from a material having a Young's modulus approximately the same as the armoring the conductors may contribute to the strength of the cable. The cable may be used to support the weight of the cable when lowered into the well, as well as the motor, electronics and equipment suspended on the cable. If it is desired the cable may be used to recover the equipment from the well. In some cases the equipment may be supported against the side of the well when operating the equipment in the well, and when recovering the motor, electronics, and driven equipment from the well the tension in the cable may be greater than the combined weight of the same, due to various frictional forces on the cable, motor, electronics, and equipment.

Using medium voltage DC avoids the need to use heavy, three-conductor cables to provide AC downhole. In some embodiments, the output voltage is lower than the medium voltage supplied from the surface.

In some embodiments, the medium voltage DC power supply is in the region of 10 kV and the low voltage power supply is in the range of less than about 1 kV.

In some embodiments, the power source includes a three-phase power source that provides a low voltage AC supply and an AC/DC converter that receives the low voltage AC supply as an input and outputs the medium voltage DC supply.

The DC/DC converter can include a series of DC/DC converter modules connected in series at their inputs and in parallel at their outputs. In one embodiment, each module has an input voltage of around 400V and an output voltage of about 700V-800V. Each module can have a single-phase active bridge including an input inverter section, a transformer section, and an output rectifier section. In some embodiments, the input inverter section and output rectifier section may include input and output capacitors respectively to smooth out current ripples. As an alternative to active bridges, resonant converters or three-phase topologies can be used.

DETAILED DESCRIPTION

Figure 1:
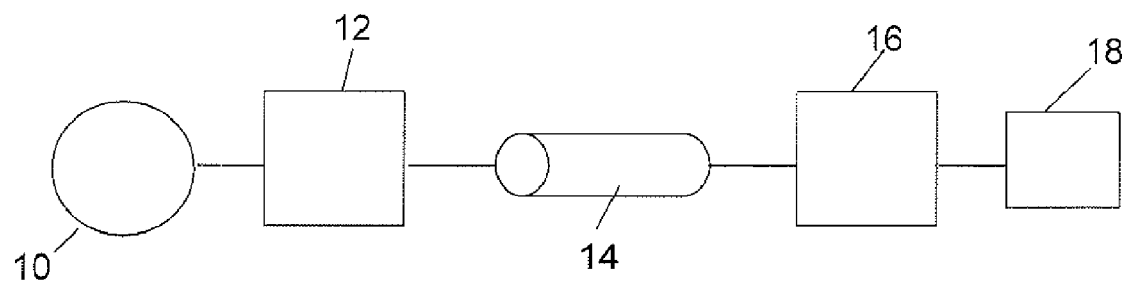
FIG. 1 shows a schematic of a power transmission system according to an embodiment.

FIG. 1 shows schematically how an embodiment of a transmission system is configured. A three-phase power source 10 is provided at the surface of the borehole (not shown). In some embodiments, the three-phase power source 10 may provide a low voltage AC supply of around 400V at 50 Hz. An AC/DC converter 12 is used to turn this into a medium voltage DC transmission supply of 10 kV. This can be passed downhole by means of a single-phase, two-conductor cable 14. The relatively high transmission voltage (10 kV) means that a correspondingly lower current can be used to meet downhole power requirements, which in turn leads to lower power losses along the cable. Thus a relatively light, thin cable can be used for the transmission, avoiding some of the physical limitations of a three-phase AC system.

Figure 2:
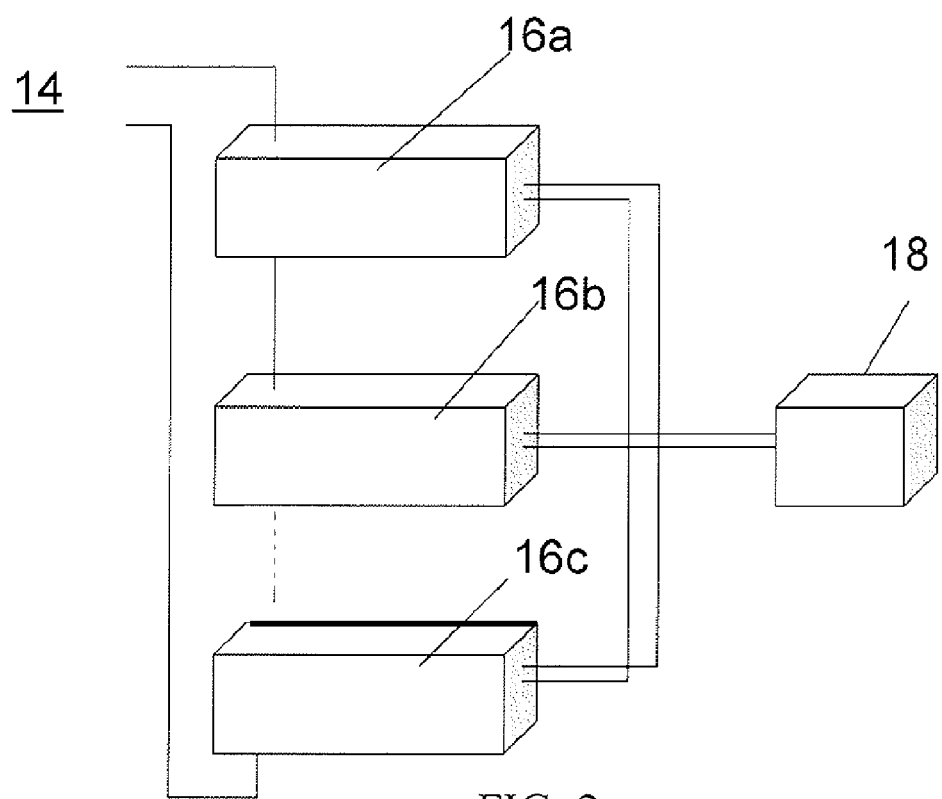
FIG. 2 shows a schematic of a modular DC/DC converter for use in a system as shown in FIG. 1.

A DC/DC converter 16 is located downhole at the end of the cable 14. The purpose of this converter is to convert the medium voltage DC supply of 10 kV on the cable to a level usable by the downhole equipment 18. In this case, the DC/DC converter 16 steps the voltage down to 800V. To achieve this step down, a modular structure is used for the converter, as is shown in FIG. 2. A series of converter modules 16a, 16b, ..., 16n is provided. The inputs of the modules are connected together in series to the output of the cable 14. The outputs from the modules are connected in parallel to the load (downhole equipment such as an ESP) 18. Each module 16a, 16b, ..., 16n converts an input voltage of 400V to an output voltage of 800V. So, by connecting the inputs of 25 modules in series, an input source of 10 kV is handled (25×400V=10 kV). The series connection at the output of the modules ensures that the 800V level is maintained.

Figure 3:
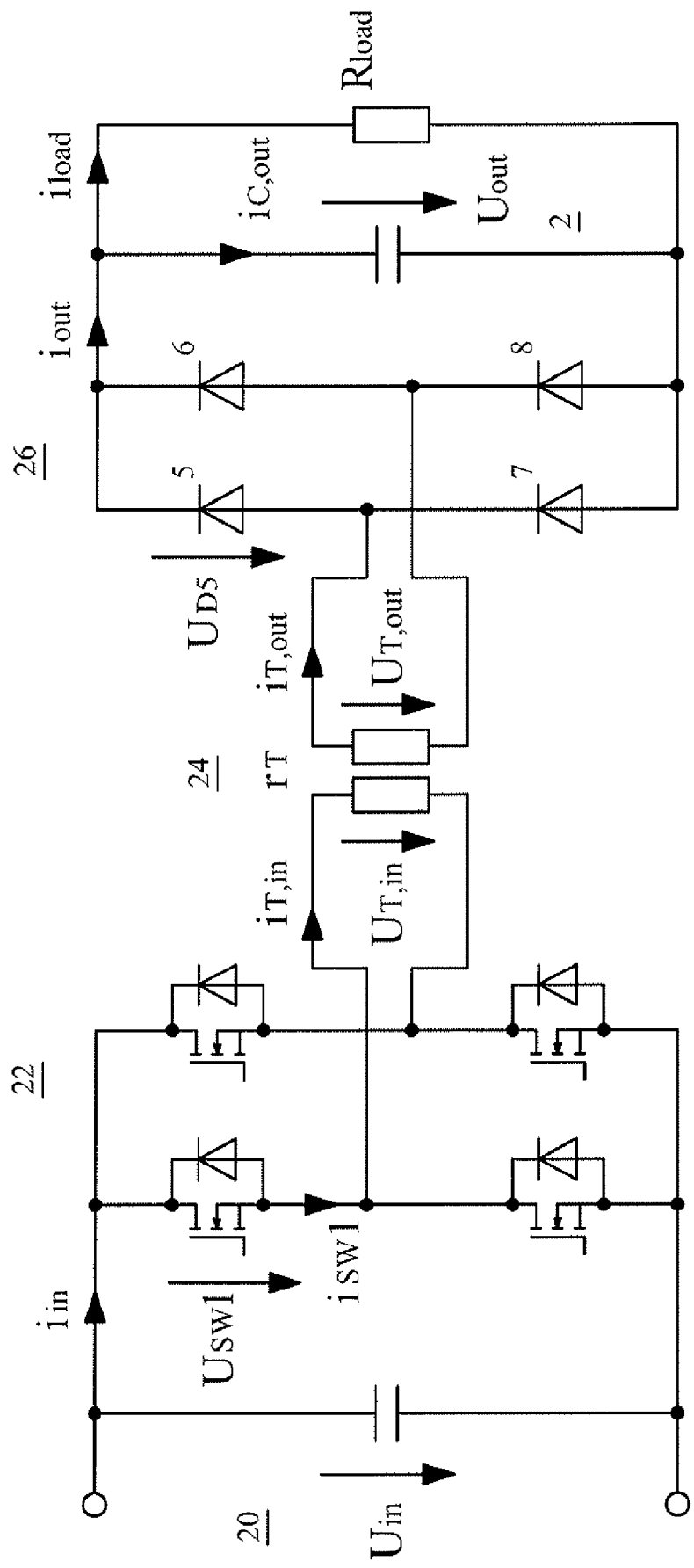
FIG. 3 shows a circuit topology for a DC/DC converter module for use in the converter shown in FIG. 2.

Each converter module 16a, 16b, ..., 16n has topology called a 'single-phase active bridge'. The basic circuit topology is shown in FIG. 3 and includes an input capacitor 20, an inverter section 22 having four MOSFET devices, a transformer 24, an output rectifier including four diodes, and an output capacitor 28. The inverter section 22 generates a rectangular AC voltage at the input of the transformer 24 that is stepped up by the transformer 24 (winding ratio=1/2) and rectified by the rectifier 26 at the output. The input and output capacitors 20, 28 smooth the voltages and reduce current ripple.

Figure 4:
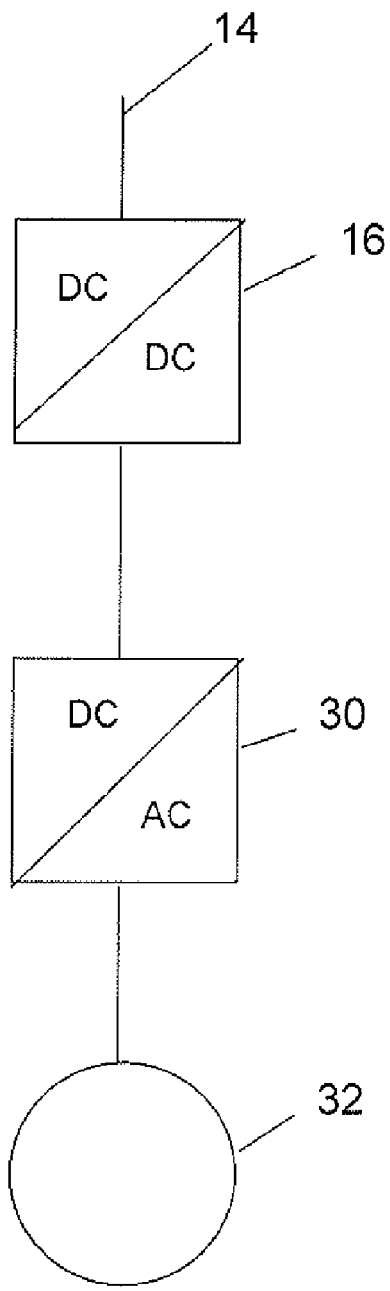
FIG. 4 shows the configuration of a downhole system to power AC induction equipment.

With the output of the converter 16 being provided as low voltage DC, on embodiment uses this to power AC downhole equipment as is shown in FIG. 4. The output from the converter 16 is provided to a DC/AC inverter 30 which in turn provides an AC low voltage output (e.g. in the region of 400V-600V) for use in induction-powered equipment.

Figure 5:
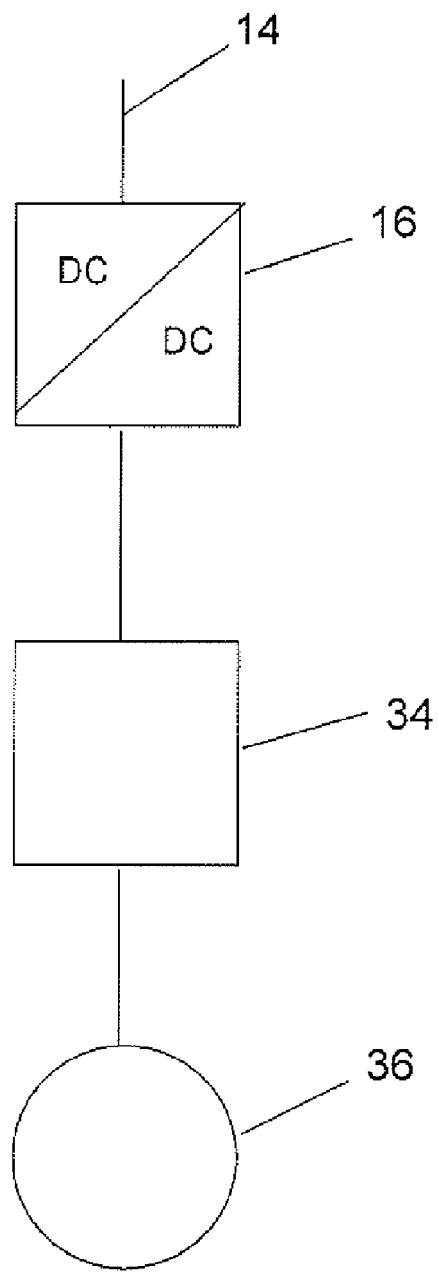
FIG. 5 shows a system according to an embodiment using an SRM.
Figure 6:
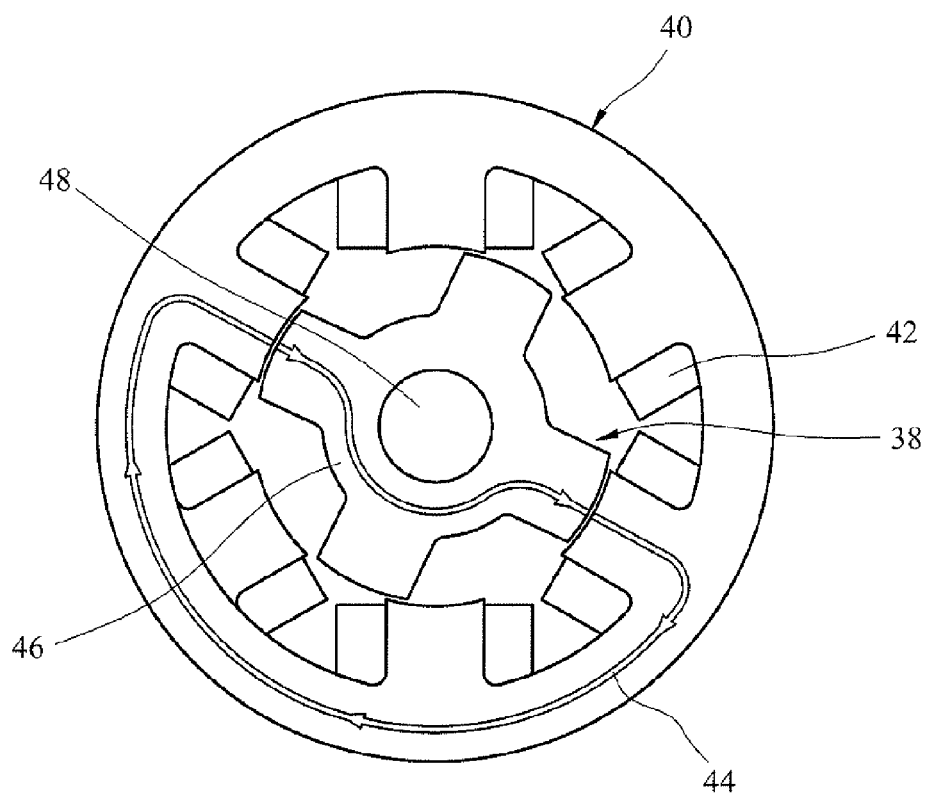
FIG. 6 shows a cross section of a three-phase switched reluctance motor.

In some embodiments, the output from the converter 16 is provided to equipment powered by a switched reluctance motor (SRM). SRMs have a number of well-know advantages. However, to date, their use in downhole applications has not been known. FIG. 5 shows the configuration of a system using an SRM. In this case, the output of the DC/DC converter 16 is provided to a low voltage SRM converter 34 that is used to supply an SRM powered ESP. FIG. 6 shows a cross section of a three-phase switched reluctance motor having a four-lobed rotor 38 mounted for rotation in a six-lobed stator 40. Each lobe of the stator 40 is provided with electrical windings 42 and opposing lobes A, A', B, B' and C, C' are interconnected in series to define the three motor phases. Energizing one set of opposing lobes causes the rotor to rotate until one pair of its lobes are aligned with the energized lobes such that the magnetic flux in the rotor and stator has the smallest reluctance (reluctance=magnetic resistance in a magnetic circuit). FIG. 6 shows the rotor 38 in position for alignment with phase C, C' energized the magnetic circuit being indicated by the white line 44. Sequentially switching energization to other pairs of lobes can then cause the rotor 38 to rotate as it moves to align its loves with those of the energized pair of the stator 40 to reduce the reluctance. From the position of FIG. 6, switching energization to lobes A, A' and then to B, B' will cause the rotor to rotate in an anti-clockwise direction. With appropriate selection of the number of lobes on the rotor and stator, a degree of redundancy can be obtained that allows operation to continue even when one pair of lobes fails.

Materials for construction of SRMs are well-known. However, certain materials selections can improve performance in the chosen environment. In some embodiments aluminum windings are used. Also, filing the slots between the lobes in the rotor and/or stator with a resin material may improve electrical performance.

Temperature control can be an issue in downhole applications. For this reason, cooling channels can be provided inside the windings. Also, the shaft 46 of the rotor 38 can be hollow, with a central channel 48 to allow circulation of cooling fluid.

Figures 7, 8, 9:
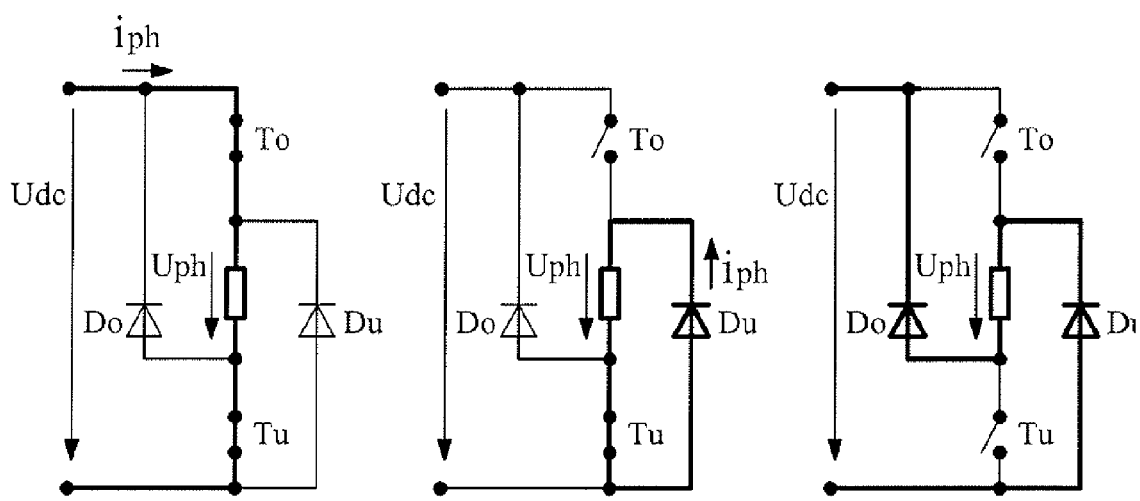
FIGS. 7-9 show the switching states of an asymmetrical half-bridge converter.

Various switching techniques can be used for SRMs. As the torque generated is independent of the direction of current, a simple technique can be used. In some embodiments, an asymmetrical half-bridge converter can be used. FIGS. 7-9 show the switching states of an asymmetrical half-bridge converter. The switching states of FIGS. 7 and 9 allow magnetization and demagnetization of one phase of the SRM. In the switching state of FIG. 8, one phase is short-circuited. A hysteresis current control can be implemented using these switching states. Table 1 below shows the excitation states of the asymmetrical half-bridge (1=device conducts current, 0=device with zero current).

TABLE 1

| Switching State | Property | T | T | D | D | $U_{ph}$ |
|---|---|---|---|---|---|---|
| FIG. 7 | Magnetization | 1 | 1 | 0 | 0 | $U_{dc}$ |
| FIG. 8 | Freewheeling (phase shorted) | 0 | 1 | 0 | 1 | 0 |
|  |  | 1 | 0 | 1 | 0 | 0 |
| FIG. 9 | Demagnetization | 0 | 0 | 1 | 1 | $-U_{dc}$ |

Figure 10:
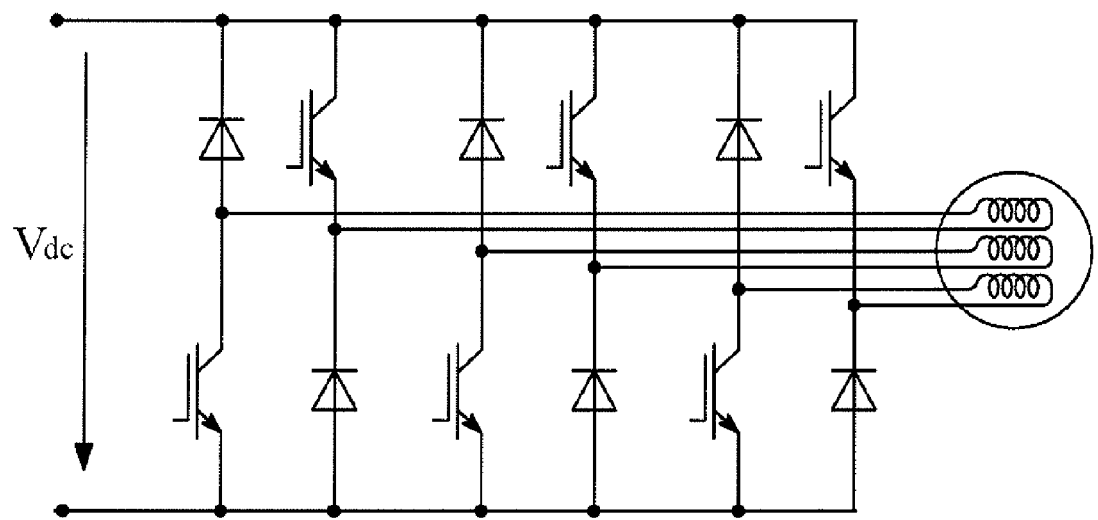
FIG. 10 shows an asymmetrical half-bridge converter for an SRM.

FIG. 10 shows an asymmetrical half-bridge converter for an SRM. As can be seen, the converter phases are decoupled and work independently of each other. If one phase of the converter has a fault, the SRM can be temporarily operated with a degraded performance on the remaining phases without shutting down the complete system.

Figure 11:
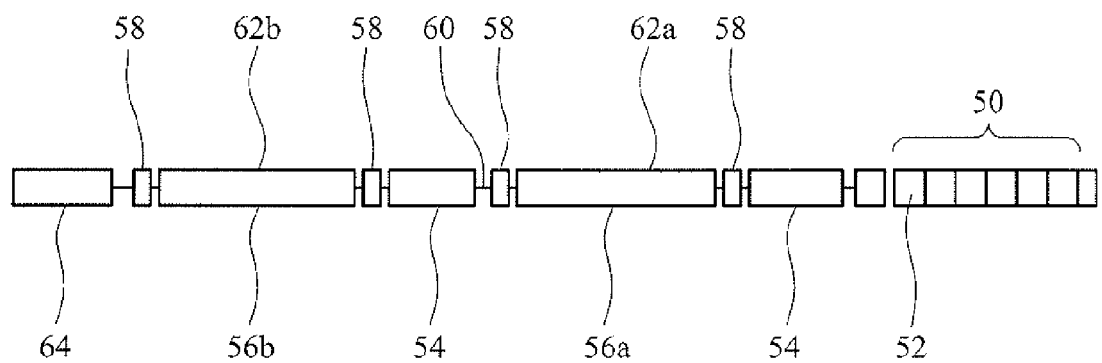
FIG. 11 shows an embodiment of the invention comprising a ESP.

FIG. 11 shows an embodiment including an ESP. This embodiment includes a modular DC/DC converter 50 having a number of converter modules 52 (see FIGS. 2 and 3). The converter 50 provides power to a modular motor section 54 that includes two SRMs 56a, 56b mounted in bearings 58 on a common shaft 60. Each SRM 56a, 56b has an associated low voltage SRM DC/AC converter 62a, 62b with appropriate switching electronics to drive the SRM. The shaft 60 drives the ESP 64 directly without any gearbox (one may be provided if necessary depending on the operating characteristics of the ESP and SRMs).

The modular nature of the motor section 54 allows articulated joints to be provided in the shaft between the SRMs 56a, 56b which means that the overall arrangement can be positioned in tortuous boreholes. Such joints can be provided with bellows housings to allow flexing while maintaining the inside of the system separate from the borehole environment.

While two SRMs are show in FIG. 11, the number can be selected according to power requirements of the ESP 64 and the power rating of the individual SRMs 56. When multiple motor modules are present, a DC bus bar can be provided to run along channels in the modules and connect the array together.

Because the SRM controllers 62 are positioned close to the associated SRM 56, it is possible to apply more accurate control to the operation of the SRMs. For example, it is possible to accurately control the startup procedure so as to limit the amount of overheating that can occur when the ESP is starting up and subject to high resistance. In one embodiment, the system can include temperature sensors that can feed back data to the SRM controllers to limit the current to limit overheating and potential burn-out.

Thermal management can be important to ensure reliability. In some embodiments, the electrical components may be housed in pressure and temperature-tolerant housings and may be filled with liquid coolant that can be circulated to prevent heat build-up. The coolant can also be arranged to circulate in cooling channels in the rotor and stator and through the centre of the SRM shaft.

Because of the degree of control offered by the use of SRMs, nonstandard mode of operation can be adopted. For example, when the pump is not actively pumping well fluids, it can be rotated at a very low speed (idle). This can have the advantages of reducing the likelihood of blockages or solids build-up in the pump chamber which could hinder or prevent restarting of the pump. By characterizing the speed and power consumption of the pump, and by knowing its dimensions, it is possible to interpret its power consumption at low speeds to determine the viscosity of the well fluids. Also, the direction of operation of the pump can be reversed from time to time to clear blockages.

It is also possible to arrange the rotor of the SRM to be moveable axially in the stator to accommodate operational or installation necessities since the stator is essentially passive with no wiring necessary for operation.

Other changes can be made while staying within the scope of the invention. For example, motors other than SRMs can be used. In some embodiments, an induction (squirrel cage) motor may be used. In some embodiments, a permanent magnet motor may be used. Such a motor can be operated using adaptations of the techniques discussed above. It may also be possible to use a cable voltage slightly above the rated voltage of the motor and avoid the need for a DC/DC transformer.

The downhole equipment that can be used is not restricted to ESPs but can include other forms of multi-stage centrifugal pumps; moineau (progressive cavity) pumps; other forms of injection and production pumps and gas compressors.

In the embodiment described above, cooling fluid is circulated through the motor. However, in some embodiments, a flow conduit, such as a stationary non rotating tube, or flow conduit, can be placed inside the center of the rotor, and cooling fluid can be circulated in the annulus between the rotor and the tube, thus reducing sealing problems. The tube can be used to allow fluids to flow through the center of the motor. For example, in a production well the produced fluid can blow through the center of the rotor; in an injection well the injected fluid can flow through the center of the rotor; in a situation where down-hole separation is used injected and produced fluid can flow through the center of the rotor; in direct circulation drilling (drilling fluid pumped down the center and cuttings and drilling fluid flow back up the annulus) the drilling fluid (a gas or liquid or mixture) can flow downwards through the rotor; and in a reverse circulation drilling, drilling-fluid and cuttings can flow up through the rotor.

The rotating motor shaft can also drive a circulating fan or pump to circulate cooling fluid through the electronics. This can be the main motor driving the pump, or an auxiliary motor. Also the cooling fluid can be used to lubricate the motor and as well as cool the electronics.

The invention claimed is:

1. A downhole equipment system for use in boreholes, the downhole equipment system comprising:
    a power transmission system including:
        a power source positioned at the surface providing a DC power supply;

a downhole DC/DC converter; and
a two-conductor cable connecting the power source and the downhole DC/DC converter; and
downhole equipment including an electric motor, located in the borehole and connected to the power transmission system;
wherein:
the downhole DC/DC converter receives a DC voltage from the DC power supply as an input and provides an output DC supply at a different voltage to the downhole equipment,
the electric motor comprises a series of motor modules, each of the motor modules is operable to drive the downhole equipment, and
each motor module comprises a rotor and stator arrangement with an associated DC/AC converter, the rotors being connected to a drive shaft for driving the equipment.

2. A system as claimed in claim 1, wherein the electric motor comprises a switched reluctance motor for driving the downhole equipment.

3. A system as claimed in claim 2, wherein the switched reluctance motor comprises a stator and a rotor, each having cooling channels carrying a cooling fluid.

4. A system as claimed in claim 2, wherein the switched reluctance motor comprises aluminum windings.

5. A system as claimed in claim 1, wherein the electric motor has a rotor comprising a hollow shaft through which well fluids or a cooling fluid can circulate.

6. A system as claimed in claim 1, wherein the electric motor comprises a salient rotor structure with a neutral material filling the spaces between lobes of the rotor.

7. A system as claimed in claim 1, wherein the electric motor is connected to the equipment so as to provide direct drive without a gearbox.

8. A system as claimed in claim 1, wherein a single DC/DC converter is provided for all motor modules.

9. A system as claimed in claim 1, wherein a DC bus bar extends through the electric motor connecting each motor module.

10. A system as claimed in claim 1, wherein the electric motor is articulated between motor modules.

11. A system as claimed in claim 10, wherein a bellows housing is provided around the articulations.

12. A system as claimed in claim 1, further comprising means to shift each rotor axially in its associated stator.

13. A system as claimed in claim 1, further comprising sensors for monitoring one or more properties of the downhole equipment and a feedback system for using outputs of the sensors to control operation of the electric motor.

14. A method of operating a downhole equipment system including a motor, a power transmission system having a power source positioned at the surface providing a DC power supply, a downhole DC/DC converter and a two-conductor cable connecting the power source and the downhole DC/DC converter, the method comprising:
providing low voltage DC power at the output of the downhole DC/DC converter;
converting the low voltage DC power into AC power; and using the AC power to operate the motor.

15. A method as claimed in claim 14, comprising monitoring one or more properties of the downhole equipment, and using values of these properties to control operation of the motor.

16. A method as claimed in claim 15, wherein the monitored property comprises a temperature of the downhole equipment.

17. A method as claimed in claim 16, comprising controlling the current provided to the motor so as to maintain the monitored temperature within predefined limits.

18. A method as claimed in claim 14, comprising periodically reversing a direction of operation of the motor to clean the downhole equipment.

19. A method as claimed in claim 14, comprising operating the motor so as to operate the equipment at a very low speed when it is not in use.

20. A power transmission system for use with downhole equipment in a borehole, the power transmission system comprising:
a power source positioned at the surface providing a medium voltage DC power supply;
a downhole DC/DC converter; and
a two-conductor cable connected between the power source and the downhole DC/DC converter;
wherein:
the downhole DC/DC converter receives the DC voltage from the DC power supply as an input and provides a low voltage power supply for provision to the downhole equipment, and
the DC/DC converter comprises a series of DC/DC converter modules each having an input and an output, the series of DC/DC converter modules connected in series at their inputs and in parallel at their outputs.

21. A system as claimed in claim 20, wherein the cable contains additional electrical conduits for instrumentation or control purposes.

22. A system as claimed in claim 20, wherein the cable contains one or more additional flow conduits for delivering insulating and or lubricating oil to a motor, control system and driven equipment to compensate for leakage losses.

23. A system as claimed in claim 20, wherein the cable is used to support the self weight of the cable when lowered into the well, as well as a motor, electronics and equipment suspended on the cable.

24. A system as claimed in claim 20, wherein the medium voltage DC power supply is in the region of 10 kV and the low voltage power supply is less than about 1 kV.

25. A system as claimed in claim 20, wherein the power source comprises a three-phase power source providing a low voltage AC supply and an AC/DC converter taking the low voltage AC supply as an input and outputting the medium voltage DC supply.

26. A system as claimed in claim 20, wherein each module has an input voltage of around 400V and an output voltage of about 700V-800V.

27. A system as claimed in claim 20, wherein each module comprises a single-phase active bridge including an input inverter section, a transformer section, and an output rectifier section.

28. A system as claimed in claim 27, wherein the input inverter section and output rectifier section include input and output capacitors respectively to smooth out current ripples.

29. A downhole equipment system for use in boreholes, the downhole equipment system comprising:
a power transmission system including:
a power source positioned at the surface providing a DC power supply;
a downhole DC/DC converter; and
a two-conductor cable connecting the power source and the downhole DC/DC converter; and
downhole equipment including an electric motor, located in the borehole and connected to the power transmission system;

wherein:
the downhole DC/DC converter receives a DC voltage from the DC power supply as an input and provides an output DC supply at a different voltage to the downhole equipment,
the electric motor comprises a series of motor modules,
each of the motor modules is operable to drive the downhole equipment, and
a DC bus bar extends through the electric motor connecting each motor module.

30. A downhole equipment system for use in boreholes, the downhole equipment system comprising:
a power transmission system including:
a power source positioned at the surface providing a DC power supply;
a downhole DC/DC converter; and
a two-conductor cable connecting the power source and the downhole DC/DC converter; and
downhole equipment including an electric motor, located in the borehole and connected to the power transmission system;
wherein:
the downhole DC/DC converter receives a DC voltage from the DC power supply as an input and provides an output DC supply at a different voltage to the downhole equipment,
the electric motor comprises a series of motor modules,
each of the motor modules is operable to drive the downhole equipment, and
the electric motor is articulated between motor modules.

31. A power transmission system for use with downhole equipment in a borehole, the power transmission system comprising:
a power source positioned at the surface providing a medium voltage DC power supply;
a downhole DC/DC converter; and
a two-conductor cable connected between the power source and the downhole DC/DC converter;
wherein:
the downhole DC/DC converter receives the DC voltage from the DC power supply as an input and provides a low voltage power supply for provision to the downhole equipment, and
the cable contains one or more additional flow conduits for delivering insulating and or lubricating oil to a motor, control system and driven equipment to compensate for leakage losses.

32. A power transmission system for use with downhole equipment in a borehole, the power transmission system comprising:
a power source positioned at the surface providing a medium voltage DC power supply;
a downhole DC/DC converter; and
a two-conductor cable connected between the power source and the downhole DC/DC converter;
wherein:
the downhole DC/DC converter receives the DC voltage from the DC power supply as an input and provides a low voltage power supply for provision to the downhole equipment, and
the power source comprises a three-phase power source providing a low voltage AC supply and an AC/DC converter taking the low voltage AC supply as an input and outputting the medium voltage DC supply.

* * * * *